United States Patent Office 3,577,222
Patented May 4, 1971

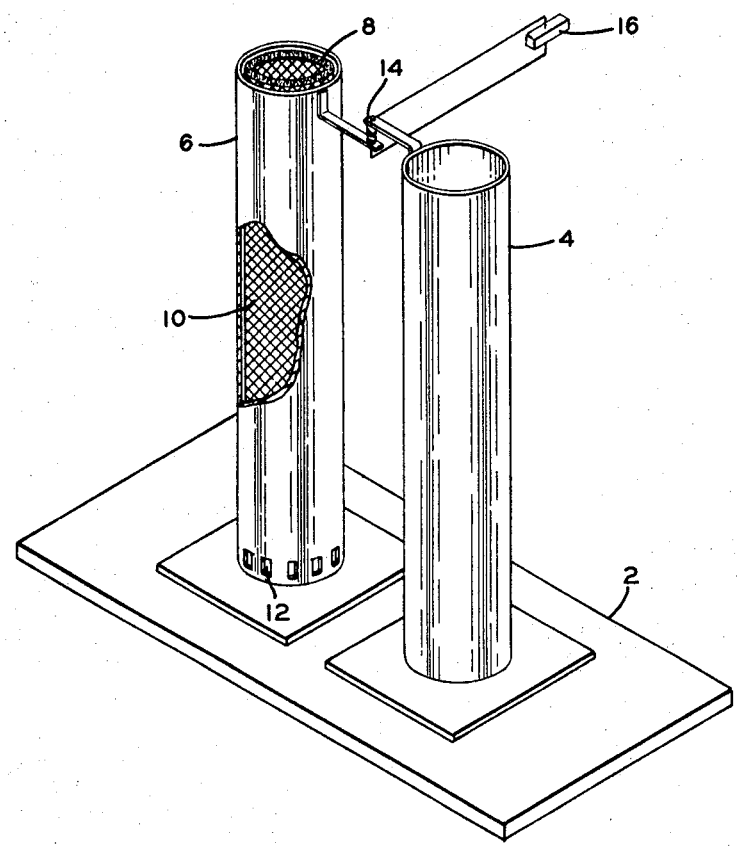

3,577,222
CARBON MONOXIDE DETECTOR
John M. Ward, Lancaster, Pa., assignor to Armstrong Cork Company, Lancaster, Pa.
Filed Nov. 15, 1968, Ser. No. 776,011
Int. Cl. G01n 31/10
U.S. Cl. 23—254                                  3 Claims

ABSTRACT OF THE DISCLOSURE

The carbon monoxide detector comprises two parallel mounted cylinders of metal having a high coefficient of linear expansion and spaced apart from one another on a common base. A chemical catalyst of the type capable of generating heat when exposed to a minimal concentration of carbon monoxide is mounted within a porous tube placed within one of the cylinders. Free air is allowed to enter the catalyst containing cylinder from its base and circulate about the catalyst. The heat generated by the catalytic reaction of carbon monoxide in air will cause the linear expansion of the cylinder thereby closing the microswitching mechanism mounted partly at the top of each cylinder. By using two cylinders having a high coefficient of linear expansion, changes in ambient temperature may be compensated for.

BACKGROUND OF THE INVENTION

Field of the invention

The present invention concerns a gas detector and in particular a gas detector which operates in the presence of minute quantities of undesired gas in an atmosphere.

Description of the prior art

There have been many types of gas detectors in the past. Many of these structures will use a catalytic agent which is affected by the presence of a certain gas in the atmosphere. The reaction of the gas with the catalyst usually causes a temperature change which in turn will affect some type of temperature sensitive element. This element in turn is connected to a control system for providing some type of alarm or indication readings.

A typical system is shown in Pat. No. 2,916,358 wherein a Hopcalite catalyst is used to detect the presence of carbon monoxide, and the heat generated by the reaction of the Hopcalite and carbon monoxide affects a thermistor. The thermistor in a bridge circuit is used to control an alarm circuit.

Pat. No. 2,306,509 shows another type of gas detector wherein a catalyst coat on a wire is placed in contact with the gas to be detected. The presence of the gas causes a reaction with the catalyst, raising the temperature of the wire and causing it to expand to operate a control circuit.

Both of the above gas detecting devices and all other gas detecting devices suffer from the same deficiency in that they are incapable of compensating for a wide range of variation in ambient temperature. It is possible in these devices for the ambient temperature to reach a temperature such that the heat of the atmosphere will be sufficient to actuate the circuitry and provide a false reading as to the presence of the gas. It is the major object of the below-described device to provide a gas detector which is capable of operating in a wide range of temperatures.

SUMMARY OF THE INVENTION

The carbon monoxide detector herein comprises two parallel mounted cylinders of an aluminum alloy having a high coefficient of linear expansion and spaced apart from one another on a common base. Hopcalite, a chemical catalyst of the type capable of generating heat when exposed to a minimal concentration of carbon monoxide, is mounted within a porous tube positioned within one of the aluminum cylinders. Perforations in the base of this cylinder will allow free air to enter the catalyst containing aluminum cylinder and circulate about the catalyst. Due to the catalytic reaction of the carbon monoxide with the catalyst, a certain amount of heat will be generated. This heat will cause linear expansion of the cylinder containing the catalyst. There will be no corresponding linear expansion of the adjacent parallel cylinder. However, due to changes in the ambient temperature of the air surrounding both cylinders, both cylinders will expand an equal amount in reaction to the temperature changes of the ambient air. A microswitching mechanism mounted at the top of the two cylinders will be operated only when one cylinder is caused to expand to a greater extent than the other cylinder.

BRIEF DESCRIPTION OF THE DRAWINGS

The sole figure of the drawing is a perspective view of the gas detector herein.

DESCRIPTION OF THE PREFERRED EMBODIMENT

In the preferred embodiment, a common mounting base 2 is used for the mounting of the gas detector. Mounted on the base are two parallel cylinders 4 and 6 of an aluminum alloy having a high coefficient of linear expansion and spaced apart from one another on the common base 2. The cylinders may be made of any material which has a high coefficient of linear expansion so that it will be affected to some small degree by a minimal quantity of heat. The cylinders may be hollowed and a catalyst placed therein or the cylinders may be solid and the catalyst placed therearound. In the drawing, a chemical catalyst 8 is placed in a porous tube 10, and this tube is in turn mounted within the hollow cylinder 6. When the gas detector is being used to detect carbon monoxide, the catalyst will be Hopcalite. Obviously other catalysts will be used depending upon the particular gas to be detected.

Perforations 12 in the base of the cylinder 6 allow air to pass into the hollow cylinder and then up around the catalyst 8 within the cylinder 6. It is apparent that either free air movement could be allowed or forced air movement could be provided by the use of some type of fan structure.

Mounted at the top of cylinder 4 is one half of a microswitching structure, and mounted at the top of cylinder 6 is the other one half of the microswitching structure. Each cylinder carries one contact of the microswitch control structure 14. When there has been a greater linear expansion of cylinder 6 over that of cylinder 4, the contacts of the microswitch control structure 14 will be closed and operate some type of indicating or alarm structure 16. The reaction of the gas to be detected, in this case carbon monoxide, with the catalyst, in this case Hopcalite, will result in the generation of heat which will cause the cylinder 6 to expand to a greater degree than would cylinder 4, both cylinders being affected equally by the temperature of the ambient air surrounding both cylinders.

Consequently, this particular gas detector would be particularly useful in the engine compartment of an automobile where, upon initial starting, the engine compartment is quite cold, but after the car has been running for awhile, there would be over a 100° rise in temperature. Normal gas detectors with this rise in temperature would find that their alarm circuits would have been tripped. The above-described device, having the two cylinder structures, will compensate for this rather large change in ambient temperature. Only the presence of a particular gas affecting the particular catalyst will cause one cylinder to expand to a greater degree than the other cylinder and thus set off an alarm or indicator circuit.

What is claimed is:

1. A gas detector comprising a mounting base, two parallel mounted noncorrugated, open ended cylinders of a material having a high coefficient of linear expansion being mounted at one end to said mounting base, at the other end of the two cylinders there is mounted a control switch means having one contact of the switch means fixedly mounted on the end of one cylinder and the other contact of the switch means fixedly mounted to the end of the other cylinder, an indicating means connected to the switch contacts and operative when the switch contacts are closed, a catalyst means positioned adjacent only one of the two parallel mounted cylinders, and said catalyst means being capable of generating heat when exposed to a minimal concentration of a gas so that the heat generated will directly heat only the cylinder adjacent the catalyst means to cause this cylinder to expand whereby the switch contacts will be closed to operate the indicating means, but changes in the temperature of the ambient air surrounding both parallel cylinders will affect both cylinders alike so that the switch contacts and indicating means are not actuated by a mere change in the ambient temperature of the air surrounding the cylinders.

2. The gas detector of claim 1 wherein the cylinders are hollow and the catalyst is placed within one of the hollow cylinders.

3. The gas detector of claim 2 wherein the catalyst is sensitive to carbon monoxide.

References Cited

UNITED STATES PATENTS

| 1,467,911 | 9/1923 | Arendt et al. | 23—255EUX |
| 2,458,610 | 1/1949 | Lindstrom | 23—232X |

MORRIS O. WOLK, Primary Examiner

R. M. REESE, Assistant Examiner

U.S. Cl. X.R.

23—232, 255